O. W. WILES.
PATCH FOR VEHICLE TIRES.
APPLICATION FILED APR. 24, 1908.
915,918.
Patented Mar. 23, 1909.
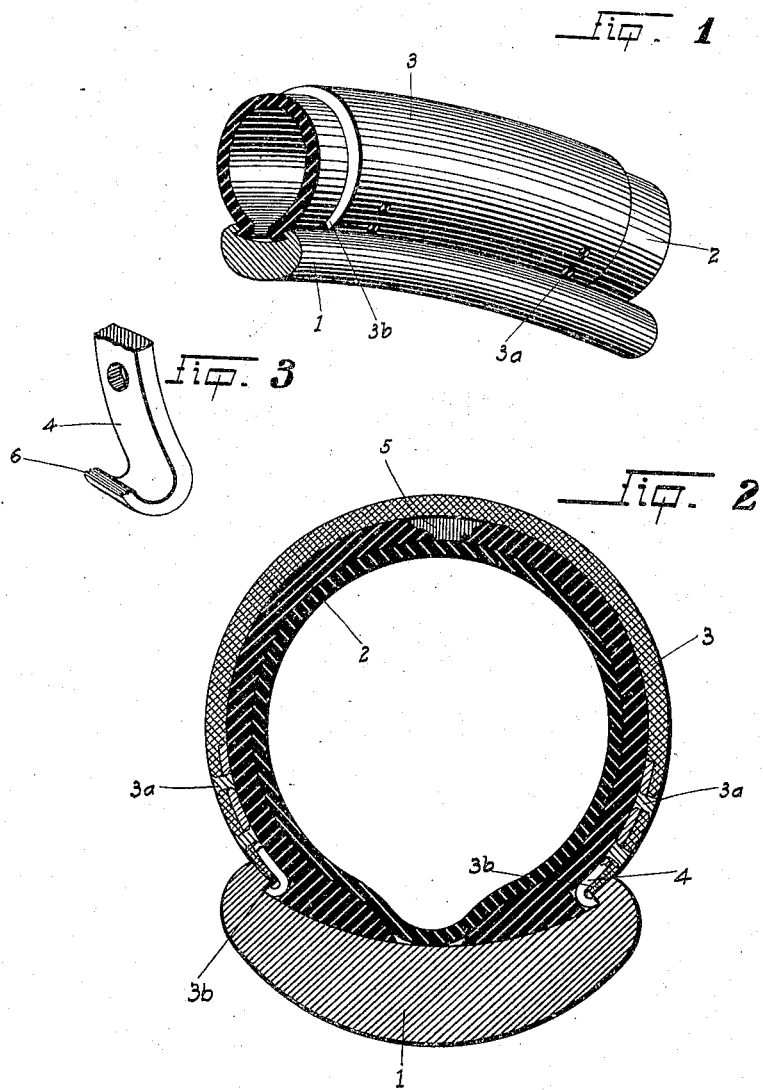
Witnesses
Inventor
Oscar W. Wiles
Attorney

UNITED STATES PATENT OFFICE.

OSCAR W. WILES, OF OAKLAND, CALIFORNIA.

PATCH FOR VEHICLE-TIRES.

No. 915,918.    Specification of Letters Patent.    Patented March 23, 1909.

Application filed April 24, 1908. Serial No. 428,922.

*To all whom it may concern:*

Be it known that I, OSCAR W. WILES, a citizen of the United States, residing at Oakland, in the county of Alameda and State of California, have invented certain new and useful Improvements in Patches for Vehicle-Tires; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in the methods of patching automobile tires, the object of the invention being to produce a patch which can be immediately and effectually affixed without the necessity of using any glue, gum, paste or other auxiliary material; also to produce a patch formed of but one mechanism whereby no particular skill is required to insert the same; also to produce a simple, effective and inexpensive device for the purpose which can be inserted without necessity of using other tools, thus reducing the expense of equipment etc. for an automobile. These objects I accomplish by means of a patch of suitable material of such shape as to conform to the shape of the tire, such patch being provided with metal hooks adapted to engage the rim of the wheel in such manner as to hold such patch in stationary position; also by such other and further construction as will appear by a perusal of the following specification and claim.

In the drawings similar characters of reference indicate corresponding parts in the several views.

Figure 1 is a perspective view of a fragmentary portion of a tire and rim showing my improved patch installed thereon. Fig. 2 is a cross section of a tire and patch therefor. Fig. 3 is a fragmentary perspective view of a hook.

Referring now more particularly to the characters of reference on the drawings 1 designates the rim of a wheel on which is secured the usual tire 2 in the usual way.

3 designates the patch made of suitable material such as canvas rubber fabric and shaped to conform to the contour of the tire. On each edge of the patch 2 are secured, by rivets $3^a$ or otherwise, band metal hooks 4, said hooks being secured to the inside of the patch 3, and being set into the patch flush with the inner edge thereof as shown in Fig. 2, the rivets $3^a$ being also flushed to form a smooth inner surface.

When a hole 5 is burst in the tire, or in case of a cut or weak spot from wear, the patch 2 is placed over the same and the hooks 4 engage with the inner edge of the rim 1 and then the tire is pumped up in the usual way, the patch protecting and preventing the weakened portion of the tire from further spreading, the hooks 4 combined with the friction of the inflation of the tire of course maintaining and holding the patch in proper position.

Thus it will be seen that I have produced a patch of great simplicity and one in which there is required nothing extra in and about the inserting of the same and also one which requires no tampering with the tire or any gum, glue or paste to make the patch adhesive to the tire sufficiently to close the break.

The hooks 4 may be serrated at their ends as at 6 to form a better gripping or biting surface for the purpose.

From the foregoing description it will be seen that I have produced a patch for automobile tires which substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A patch for pneumatic tires comprising the combination with a tire and rim of an independent patch member enveloping said tire, hooks secured in said patch member and having their inner surfaces flush with the inner surfaces of said patch member, the ends of said hooks being provided with a plurality of sharp serrations biting into the flange of said rim, as and for the purposes described.

In testimony whereof I affix my signature in presence of two witnesses.

OSCAR W. WILES.

Witnesses:
  E. H. LOHMANN,
  MARK S. ARMSTRONG.